(12) United States Patent
Kunze et al.

(10) Patent No.: US 8,226,897 B2
(45) Date of Patent: Jul. 24, 2012

(54) FIBER MAT CONTAINING AN ORGANOSILICON COMPOUND AND POLLUTION CONTROL DEVICE USING IT

(75) Inventors: Ulrich E. Kunze, Juechen (DE); Claus Middendorf, Neuss (DE); Harald H. Krieg, Meerbusch (DE)

(73) Assignee: 3M Innovative Properties Company, St. Paul, MN (US)

( * ) Notice: Subject to any disclaimer, the term of this patent is extended or adjusted under 35 U.S.C. 154(b) by 326 days.

(21) Appl. No.: 12/593,647

(22) PCT Filed: Mar. 28, 2008

(86) PCT No.: PCT/US2008/058622
§ 371 (c)(1),
(2), (4) Date: Mar. 1, 2010

(87) PCT Pub. No.: WO2008/121801
PCT Pub. Date: Oct. 9, 2008

(65) Prior Publication Data
US 2010/0150791 A1    Jun. 17, 2010

(30) Foreign Application Priority Data
Mar. 30, 2007   (GB) .................................. 0706166.6

(51) Int. Cl.
*B01D 50/00*   (2006.01)
(52) U.S. Cl. ........................................................ 422/179
(58) Field of Classification Search .................. 422/179, 422/180; 428/221, 447
See application file for complete search history.

(56) References Cited

U.S. PATENT DOCUMENTS

| | | |
|---|---|---|
| 3,441,381 A | 4/1969 | Keith et al. |
| 3,445,267 A | 5/1969 | Layne |
| 3,493,424 A | 2/1970 | Mohrlok et al. |
| RE27,747 E | 9/1973 | Johnson |
| 3,944,702 A | 3/1976 | Clark |
| 4,351,736 A | 9/1982 | Steinberger et al. |
| 4,781,844 A | 11/1988 | Kortmann et al. |
| 5,073,442 A | 12/1991 | Knowlton et al. |
| 6,231,818 B1 | 5/2001 | Ten Eyck |
| 2009/0272600 A1* | 11/2009 | Okabe et al. .................. 181/227 |
| 2010/0207298 A1* | 8/2010 | Kunze et al. .................. 264/321 |

(Continued)

FOREIGN PATENT DOCUMENTS

EP        0 742 184        11/1996

(Continued)

OTHER PUBLICATIONS

Search Report.

*Primary Examiner* — Tom Duong (57) ABSTRACT

The present invention relates to a fiber mat, preferably a non-intumescent, polycrystalline, needle-punched or stitch-bonded aluminia-silica fiber mat, which contains an organosilicon compound. The fiber mat comprises a fiber blanket which is essentially free of organic binder and which is impregnated with an organosilicon compound selected from the group consisting of siloxane compounds, alkoxy group-containing silanes, hydrolysates and condensates of these compounds, and combinations thereof. In a further embodiment the fiber mat comprises a high friction coating on at least the side of the mat which is to be brought in contact with a pollution control element of a pollution control device. Furthermore, the present invention relates to a pollution control device containing such a fiber mat.

5 Claims, 2 Drawing Sheets

U.S. PATENT DOCUMENTS

2010/0209306 A1* 8/2010 Kunze et al. .................. 422/122
2010/0209308 A1* 8/2010 Kunze et al. .................. 422/179

FOREIGN PATENT DOCUMENTS

| | | |
|---|---|---|
| JP | 57-61686 | 4/1982 |
| JP | 59-10345 | 1/1984 |
| JP | 61-239100 | 10/1986 |
| JP | 10005813 | 1/1989 |
| JP | 2002-047070 | 2/2002 |
| JP | 2002-173875 | 6/2002 |
| WO | 00/33946 | 6/2000 |
| WO | 2006/065534 | 6/2006 |
| WO | 2008/020058 | 2/2008 |

* cited by examiner

FIBER MAT CONTAINING AN ORGANOSILICON COMPOUND AND POLLUTION CONTROL DEVICE USING IT

CROSS REFERENCE TO RELATED APPLICATIONS

This application is a national stage filing under 35 U.S.C. 371 of PCT/US2008/058622, filed Mar. 28, 2008, which claims priority to Great Britain Application No. 0706166.6, filed Mar. 30, 2007, the disclosure of which is incorporated by reference in its/their entirety herein.

The present invention relates to a fiber mat, preferably a polycrystalline, needle-punched or stitchbonded alumina-silica fiber mat, which contains an organosilicon compound. In a particular aspect, the fiber mat is a non-intumescent mat. The present invention also relates to methods for making such a fiber mat. Furthermore, the present invention relates to a pollution control device (e.g., a catalytic converter, exhaust cleaning or filter device, etc.) containing a fiber mat. The pollution control device (e.g., catalytic converter) of the present invention can be advantageously used for treating exhaust gases of internal combustion engines of automobiles and other vehicles.

Exhaust gas-purifying systems such as pollution control devices for which e.g. ceramic catalytic converters are used, have been well known as means for removing carbon monoxide (CO), hydrocarbons (HC), nitrogen oxide ($NO_x$), certain particles and the like contained in exhaust gases from the engines of automobiles. A catalytic converter or particulate filter is generally composed from, for example, a honeycomb-shaped ceramic catalyst carrier (also termed "catalyst element") contained within a metal casing, namely, a housing. A pollution control device usually has a structure in which gaps between a pollution control element accommodated therein and the housing are fully filled with a heat insulating member typically formed from inorganic fibers, organic fibers and/or generally a liquid or pasty organic binder in combination (cf., e.g., Japanese Unexamined Patent Publications (Kokai) Nos. 57-61686, 59-10345, and 61-239100). As a result, the heat insulating member filling the gaps retains the pollution control element (e.g., the catalyst element) and can prevent the pollution control element from accidental mechanical shocks caused by an impact, a vibration or the like. Because neither destruction nor movement of the pollution control element takes place in the pollution control device, the pollution control element can realize a desired action over a long period of time.

In addition, when the pollution control element (e.g., the catalyst element) is to be inserted into the housing, a stuffing system wherein a fiber mat is wound around the external peripheral surface of the pollution control element so that the pollution control element and the fiber mat are integrated, and the integrated body is inserted into the cylindrical housing under pressure, has been adopted. Various types of fiber mats have currently been proposed in order to improve the operability during insertion of a pollution control element (catalyst element) (also termed "canning"), to achieve improvement of cushioning properties (bulkiness) of the fiber mat and to obtain prevention of scattering inorganic fibers into the air from the fiber mat.

For conventional catalytic converters having a stuffed structure, the fibers are usually used in the form of mats. Fiber mats such as polycrystalline fiber mats are widely used for catalytic converter and diesel filter mounting in the automotive and vehicle industry. The advantages of these mats are their wide working temperature range from low temperature diesel to very high temperature conditions, soft mounting of sensitive substrates, e.g. ultra-thin wall monoliths, very good erosion resistance and predictable long term performance. However, the operability thereof is still insufficient, and their properties should be further improved. For example, the mats are impregnated or coated with organic binders to improve the bulkiness of the blankets and prevent the inorganic fibers from scattering. However, as the organic binder contained in the mats causes an increase of the coefficient of friction between the mats and the metal housing and the slipperiness of the mats is lowered, a larger stuffing load is required. Moreover, when the friction between the mat and the metal housing is too strong, slip occurs between the mat and the catalyst element around which the mat is wound, so that the catalyst element cannot be inserted into the housing. Furthermore, the organic binder within the fiber mat stiffens during heating so that the elasticity of the fiber mat decreases and in the worst case the pollution control element is no longer sufficiently retained by the fiber mat within the housing.

Commercial fiber mats contain more than 1% and up to 18% and even more of an organic binder, whereby mats with about 10% binder have the biggest market share. A minimum of organic binder is sometimes necessary to prevent damage of the polycrystalline fibers during mat handling and specifically during the canning process. In addition the organic binder reduces or prevents the release of fibers, which are irritant to human skin. Current low organic binder containing polycrystalline fiber mats have restrictions when they are processed using the stuffing process, which is the most commonly used converter production method. These restrictions apply specifically to applications at higher mount densities, which are e.g. used for diesel filter mounting. Experts believe that this is caused by the relatively low shear resistance of these mats compared to e.g. polycrystalline fiber mats with 10% binder.

If organic binders within fiber mats are not sufficiently decomposed and dissipated they can provide unpleasant smell for a long time. Furthermore, organic binders can cause on-board-diagnostic (OBD) sensor issues during the first uses of a new pollution control device. The OBD sensor will give a signal showing that the pollution control device does not work properly. An example of an OBD would be a "Lambda Sensor". Therefore, it is still desirable to further reduce the amount of organic binder to avoid smell and OBD sensor issues during the first uses of a new pollution control device and to further increase the performance at low operating temperatures, e.g. at about 200° C.

In a first aspect, the present invention provides a fiber mat comprising inorganic fibers impregnated with the organosilicon compound selected from the group consisting of siloxane compounds, preferably silsesquioxanes, alkoxy group-containing silanes, preferably trialkoxysilanes, hydrolysates and condensates, preferably self-condensates, of these compounds, and combinations thereof. Typically, the fiber mat is non-intumescent. Generally, the fiber mat is needle-punched. In a particular embodiment, the inorganic fibers may be selected from alumina fibers, silica fibers, alumina-silica fibers such as mullite fibers, alumino-borosilicate, zirconia, titania fibers, etc. and combinations thereof. In one embodiment, the inorganic fibers are polycrystalline such as for example polycrystalline alumina-silica fibers. In a particular embodiment, the siloxane compound is selected from silsesquioxanes, silsesquioxane copolymers, polyorganosiloxanes such as polydiorganosiloxanes, and combinations thereof. In a particular embodiment, the fiber mat is essentially free of organic binder and contains preferably less than 1%, more preferably less than 0.75%, even more preferably less than 0.5%, less than 0.25% and less than 0.1% by weight, and most preferably no organic binder, based on the total weight of the fiber mat.

In a second aspect, the present invention provides a fiber mat as described in the above aspect, further comprising a high friction coating having anti-skid properties on at least one, preferably on one of its major surfaces. The high friction coating typically does not essentially infiltrate into the fiber mat. In certain embodiments of this aspect, the high friction coating comprises an acrylic resin or rubber, such as an acrylic acid ester copolymer, a nitrile resin or rubber, a vinylacetate copolymer, a polystyrene resin, an acrylate-styrene copolymer, a styrene-butadiene resin, a SIS (styrene/isoprene/styrene) blockcopolymer, a latex, an EPDM (ethylene/propylene/diene monomer), an ABS (acrylonitrile/butadiene/styrene), a PP (polypropylene) or PE (polyethylene) film, and combinations thereof. Inorganic materials such as silica particles, alumina particles, clay particles, abrasive particles etc. can also be used as high friction coatings. Good results can be achieved using combinations of organic and inorganic high friction coating materials such as blends of the above materials, and specifically copolymers of acrylic acid esters. For example, the solid component content of the high friction coating with which the peripheral surface of the fiber mat is coated can be in the range from about 5 to 100 g/m$^2$, preferably from about 20 to 50 g/m$^2$. The high friction coating should decompose and dissipate under typical operating conditions of a pollution control device.

In a third aspect, the present invention provides a method for producing a fiber mat, the fiber mat comprising impregnating a fiber blanket with the above described organosilicon compound. In another embodiment, the method for producing said fiber mat can also comprise impregnating inorganic fibers with the organosilicon compound and forming a fiber mat from the impregnated fibers. In a further embodiment, the method further comprises (c) coating, preferably spray coating, preferably by use of an air brush, at least one peripheral surface of the resulting fiber mat with a high friction coating as described above. Preferably, the spray coating is carried out such that the high friction coating does not essentially infiltrate into the fiber mat.

In a fourth aspect, the present invention provides a pollution control device comprising (a) a housing, (b) a pollution control element (e.g. a monolith) within the housing, and (c) an inorganic fiber mat as described above arranged between the housing and the pollution control element (monolith) by, e.g., application of compressive force. If the fiber mat is coated with a high friction coating that can be decomposed and dissipated under high temperature conditions, the coating bearing surface of the fiber mat is conveniently positioned on the peripheral surface of the pollution control element. The resulting structure is inserted into a housing by preferably a stuffing process. In a practical embodiment, the external peripheral surface on the housing side of the fiber mat is not coated with a high friction coating. In this embodiment there is no high friction coating between the housing and the fiber mat but only between the fiber mat and the pollution control element of a pollution control device. Nevertheless, a high friction coating can be present on the external peripheral surface on the housing side of the fiber mat, if desired.

DESCRIPTION OF THE DRAWINGS

In FIG. 2 a catalytic converter 10 is equipped with a metal housing 4, a monolithic solid catalyst element 1 arranged within the metal housing 4 and a fiber mat 2 of the invention arranged between the metal housing 4 and the catalyst element 1. The fiber mat 2 is composed of inorganic fibers impregnated according to the present invention, wherein the internal peripheral surface 2b on the catalyst element side is coated with a high friction coating that can be decomposed and dissipated under high temperature conditions. An exhaust gas inlet 12 and an exhaust gas outlet 13 each having a truncated cone shape are attached to the catalytic converter 10.

The present invention provides a fiber mat, preferably a polycrystalline, needle-punched aluminia-silica fiber mat, which is essentially free of organic binder. The fiber mat comprises inorganic fibers impregnated with one or more of an organosilicon compound selected from the group consisting of siloxane compounds, preferably silsesquioxanes, alkoxy group-containing silanes, preferably trialkoxysilanes, hydrolysates and condensates, preferably self-condensates, of these compounds, and combinations thereof. Generally, the inorganic fiber mat is non-intumescent. In a further embodiment the fiber mat further comprises a high friction coating on at least the side of the mat which is to be brought into contact with a pollution control element of a pollution control device. Furthermore, the present invention provides a pollution control device such as, e.g., a catalytic converter (e.g., for removing carbon monoxide (CO), hydrocarbons (HC), nitrogen oxide (NO$_X$)), diesel oxidation catalysts, exhaust cleaning or filter devices (e.g., NO$_X$ traps, particulate filters, SCR (selective catalytic reduction)), closed coupled and manifold mounted converts, etc., containing such a fiber mat. For example, the pollution control element of a pollution control device may be a catalyst element, a filter element (for example, an exhaust cleaning filter for engines) or any other pollution control element. Hereinafter, the embodiments of the present invention will be described particularly referring to the fiber mat and a catalytic converter including the fiber mat, however, it should be noted that the present invention is not restricted to only these embodiments and can be applied to any type of fiber mat and pollution control element.

The catalytic converter according to the present invention can be particularly advantageously used for treating exhaust gases from internal combustion engines of automobiles and other vehicles, including gasoline engines and diesel engines. The catalytic converter comprises at least a housing and a catalyst element placed within the housing. The fiber mat according to the present invention is inserted between the metal housing and the catalyst element so that the fiber mat is wound around the external surface of the catalyst element. Although the fiber mat is usually wound around the entire surface of the catalyst element, it may also be optionally wound around only a part of the catalyst element. Furthermore, fixing means such as a wire mesh may optionally be used.

Fibers that can be used in connection with the present invention are inorganic fibers such as e.g. silica fibers, alumina fibers, zirconia fibers, alumina-silica fibers etc. Although there is no specific limitation on the thickness (average diameter) of the inorganic fibers, they appropriately have an average diameter of from about 1 to 50 μm, preferably about 2 to 25 μm, and more preferably about 2 to 14 μm, and most preferably 4 to 8 μm. Furthermore, there is no particular limitation on the length of the inorganic fibers. However, in most cases inorganic fibers will have an average length from about 0.01 to 1000 mm, preferably about 0.1 to 750 mm, and more preferably about 0.25 to 500 mm, and most preferably 0.5 to 300 mm.

For ease of describing the invention in some of its aspects, reference may be made to the term "fiber blanket" which is used to indicate a structure of inorganic fibers which are regularly or arbitrarily arranged, such as a web or non-woven material, which preferably is either needle-punched or stitch-bonded and is suitable for impregnation or coating with the organosilicon compounds used in the present invention. The fiber blanket is not restricted to any forms and can be provided e.g. in predetermined dimensions and continuous forms. Typical fiber blankets have a thickness from about 1 to 50 mm, preferably about 1.5 to 30 mm, and more preferably about 4 to 20 mm. Such fiber blankets may be optionally cut with scissors, a cutter or the like to have a desired shape and size.

Herein, the term "non-intumescent" means that a substance does not swell as a result of heat exposure, thus increasing in volume and decreasing in density.

Herein, the term "organic binder" means organic oligomers or polymers which derive from a polymerization reaction of organic polymerizable monomers or oligomers. Herein, this term does not include the organosiloxane compounds used in connection with this invention to impregnate the inorganic fibers of the fiber mat.

Herein, the term "essentially free of organic binder" means that the fiber mat contains preferably less than 1%, more preferably less than 0.75%, even more preferably less than 0.5%, less than 0.25% and less than 0.1% by weight and most preferably no organic binder, based on the total weight of the fiber mat. A method for determination of the organic binder content can be found in the experimental section below.

Herein, the term "impregnation" or "to impregnate" or "impregnated" means a treatment resulting in at least part of the fibers of a fiber mat being partially or completely coated with one or more of the organosilicon compounds. Generally at least 50%, preferably at least 60%, 70%, or 80%, more preferably at least 90% and most preferably at least 95% of the fibers of the mat will be coated with the organosilicon compounds.

Herein, the term "high friction coating" means a coating of e.g. an organic material provided on an outer surface of the fiber mat. The high friction coating has anti-skid properties and thus lowers the slipperiness of the mat and increases the coefficient of friction between the coated fiber mat and a surface, e.g. the outer surface of a pollution control element, compared to the coefficient of friction of the fiber mat without said coating. The high friction coating can decompose and dissipate completely or partly under operating conditions of the pollution control element.

Herein, the term "does not essentially infiltrate the fiber mat" means that it is preferred that the high friction coating infiltrates less than 10%, preferably less than 5%, more preferably less than 3% and most preferably less than 1% of the thickness of the fiber mat.

Herein, the term "canning" includes any method of inserting a pollution control element having a fiber mat wound around it into a metal housing.

The catalyst element or particulate filter element is usually composed of a ceramic catalyst carrier having e.g. a honeycomb structure with a plurality of exhaust gas passages and a catalyst. The fiber mat is arranged by winding it around the catalyst element or particulate filter element. The fiber mat retains the catalyst element or particulate filter element within the metal housing and seals gaps formed between the catalyst element or particulate filter element and the metal housing in addition to its functioning as a heat insulating member. As a result, the fiber mat prevents exhaust gases from bypassing the catalyst element or particulate filter element, or at least minimizes such an undesired flow. Moreover, the catalyst element or particulate filter element is firmly and elastically supported within the metal housing by the fiber mat.

In a particular embodiment, a fiber blanket is used to form the fiber mat of the present invention is composed of a fiber material having the predetermined thickness. The fiber blanket may be formed from one type of fibers, or it may be formed from two or more types of different fibers which can be arbitrarily or controlled arranged within the blanket and which can be laminated. It is usually advantageous for the fiber blanket to have predetermined dimensions in view of the handling property. The fiber blanket may optionally have also another form. The size of the fiber blanket can be varied in a wide range according to the application. For example, a fiber blanket usually has a thickness of from about 1 to about 50 mm, most preferably about 4 to 20 mm. Such a fiber blanket may optionally be cut with scissors, a cutter or the like to have a desired shape and size.

The fiber blanket and fiber mat are typically formed from inorganic fibers, typically from polycrystalline inorganic fibers containing alumina. Examples of inorganic fiber materials are alumina, silica, alumina-silica such as mullite, glass, ceramic, carbon, silicon carbide, boron, aluminoborosilicate, zirconia, titania, etc., but these examples are not restricted to the materials mentioned above. These inorganic materials may be used singly, or at least two of them may be mixed and used in combination. The inorganic fiber material may comprise alumina alone, or another inorganic material may further be used in combination with alumina, such as silica. Alumina-silica fiber materials may contain further metal oxides such as sodium, potassium, calcium, magnesium, and boron oxides. The inorganic fibers may be used either individually or in combination of two or more kinds. Among these inorganic fibers, ceramic fibers such as alumina fibers, silica fibers and alumina-silica fibers are preferably used, alumina fibers and alumina-silica fibers are more preferably used, and polycrystalline alumina-silica fibers are particularly preferred. These ceramic fibers may be used either individually or in combination of two or more kinds in the form of composite fibers and other forms.

In a particular embodiment of the invention the fiber blanket and fiber mat comprises an inorganic fiber comprising preferably a combination of alumina ($Al_2O_3$) and silica ($SiO_2$). The inorganic fiber has two components of alumina and silica, and the mixing ratio of the alumina to the silica is preferably from about 40:60 to about 96:4. The alumina fiber preferably has a mullite composition having an $Al_2O_3$:$SiO_2$ weight ratio in the range of from about 70:30 to about 74:26. Types of needle punched alumina-silica fiber blankets are commercially available under the trade name of MAFTEC®, manufactured by Mitsubishi Chemical Functional Products Inc., which comprise 95-72% $Al_2O_3$ and 5-28% $SiO_2$, in a specific embodiment 72% $Al_2O_3$ and 28% $SiO_2$. Further ceramic fiber blankets comprising a combination of alumina and silica are some types of 3M™ Nextel™ Fabrics commercially available from 3M, such as Nextel™ 550 ($Al_2O_3$:$SiO_2$=73:27) and Nextel™ 720 ($Al_2O_3$:$SiO_2$=85:15). Aluminoborosilicate fiber blankets can comprise fibers having e.g. about 50-84 wt % $Al_2O_3$, 15-49 wt % $SiO_2$ and 1-35 wt % $B_2O_3$, preferably about 60-78 wt % $Al_2O_3$, 20-38 wt % $SiO_2$ and 2-20 wt % $B_2O_3$. Examples of such fibers are 3M Nextel™ 312 ($Al_2O_3$:$SiO_2$:$B_2O_3$=62:24:14) and 3M Nextel™ 440 ($Al_2O_3$:$SiO_2$:$B_2O_3$=70:28:2).

In a further embodiment, the fiber blanket or fiber mat is a non-woven blanket or mat comprising at least 90% by weight, based on the total weight of the blanket, of chopped magnesium aluminium silicate glass fibers that have preferably a number average diameter of 5 μm or more and a length of 0.5 to 15 cm, whereby the glass fibers are needle punched or stitch bonded. The magnesium aluminium silicate glass fibers preferably comprise between 10 and 30% by weight of aluminium oxide, between 52 and 70% by weight of silicon oxide and between 1 and 12% of magnesium oxide. The weight percentage of the aforementioned oxides is based on the theoretical amount of $Al_2O_3$, $SiO_2$ and MgO. The magnesium aluminium silicate glass fiber may contain additional oxides. For example, additional oxides that may be present include sodium or potassium oxides, boron oxide and calcium oxide.

Although there is no specific limitation on the average diameter (thickness) of the inorganic fibers, they preferably have an average diameter of from about 1 μm to 50 μm, more preferably about from 2 to 14 μm, and most preferably from 4 to 8 μm, as mentioned above. When the inorganic fibers have an average diameter less than about 4 μm, the portion of respirable and potentially hazardous fibers becomes significant.

Furthermore, there is no specific limitation on the length of the inorganic fibers, similarly to the average diameter. However, the inorganic fibers preferably have an average length of from about 0.01 to 1000 mm, and most preferably about 0.5 to 300 mm, as mentioned above. When the average length of the inorganic fibers is less than about 0.5 mm, the effect of forming the fiber blanket for which the inorganic fibers are used can possibly decrease. Conversely, when the length exceeds about 500 mm, the handling property of the inorganic fibers can possibly become poor. As a result, it can be somewhat more difficult to produce the fiber blanket smoothly.

In a particular embodiment, the fiber mat and/or the fiber blanket are needle punched. Needle punching usually has the effect of orienting part of the fibers in the direction vertical to the laminated surface. As a result, the bulk specific gravity of the sheet is increased, and delamination and shifts among the layers are prevented. Although needle punching density can be widely varied, it is usually from 1-60 punches/sqm. The thickness, bulk specific gravity and strength of the mat are adjusted by the needle punching density. If the mat is stitch-bonded, the spacing of the stitches is usually from 3 to 30 mm so that the fibers are uniformly compressed throughout the entire area of the fiber blanket. If a needle-punched fiber mat of the present invention is inspected by the naked eye, the main surfaces of the mat sometimes can be differentiated into a "loop" side and a "flat" side. In comparison with each other, the loop side has a somewhat rougher, open textured surface and the flat side has a somewhat smoother, more closed textured surface. If a high friction coating is to be applied (by e.g. spray coating) onto a major surface of the fiber mat, the flat side is preferred since due to the more closed surface structure the coating composition does not essentially or hardly infiltrate the fiber mat.

The fiber blanket or mat of the present invention may be used in the form of a single blanket or mat or in the form of the composite blanket or mat. If used in the form of the composite blanket or mat, various composite forms can be taken. For example, the composite blanket or mat can be constructed comprising more layers of the same or of different types of the fiber blanket or the mat, or one or more layers of the fiber blanket or mat in combination with one or more layers of any other fiber blanket being essentially organic binder free. For example, the composite mat can be constructed comprising the fiber mat and an abrasive particle-containing fiber blanket as described in WO-A-2006/020058 wherein the fiber material of the fiber mat is the same as or different from the fiber material of the abrasive particle-containing fiber blanket. If this composite mat is wound around a catalyst element, this mat is arranged such that the abrasive particle-containing blanket contacts the surface of the catalyst element wherein the abrasive particles increase the friction between the blanket and said surface of the element.

The fiber mats used in the present invention are essentially free of organic binder and preferably contain no organic binder. A method for determination of the organic binder content of the mat can be found in the experimental section below.

In accordance with the present invention, the fibers of the mat are impregnated with one or more of an organosilicon compound selected from the group consisting of organosiloxane compounds, preferably silsesquioxanes, alkoxy group-containing silanes, preferably trialkoxy silanes, hydrolysates and condensates, preferably self-condensates, of these compounds, and combinations thereof, is used which is very thin and is hardly able to bridge crossing points of fibers. Therefore, any compression set effect is prevented which may occur at low temperatures e.g. in diesel filter, diesel converter and gasoline underbody applications. It greatly reduces the generation of fumes during the first engine start. Examples of this kind of mat have shown higher initial cold compression and higher compression retention after cycling compared to current fiber mats containing an essential content of organic binder, e.g. from more than 1 to 18 wt.-% and more organic binder. In a preferred embodiment the fiber mats have a low organic content determined via LOI (loss on ignition). Preferably, the LOI is 1% or less than 1%, more preferably 0.75% or less, even more preferably of 0.5% or less or 0.4% or less, and most preferably of 0.3% or less, as determined by the method described in the experimental section. The fiber mats according to the invention are specifically suited for stuffing, tourniquet and clamshell canning systems. Small amounts of an organic material up to 1% by weight, based on the fiber mat, may be present in the fiber mat to further reduce fiber release during the mat handling, if the organic material does not essentially impair the present invention. Preferably, the inorganic fiber mat is non-intumescent.

In one embodiment of the present invention, the fibers of the fiber mat are impregnated with one or more of an organosilicon compound selected from the group consisting of siloxane compounds, preferably silsesquioxanes, hydrolysates and condensates, preferably self-condensates, of these compounds, and combinations thereof. A hydrolysate and/or a condensate, particularly a self-condensate, of a siloxane compound sometimes can be formed e.g. in an aqueous solution of said siloxane, in particular, if said aqueous solution is not immediately but only some hours later applied. The siloxane compound, after drying, forms a very thin continuous or discontinuous coating on the fibers. Preferred examples of siloxane compounds which can be used for impregnating the fibers in the present invention are organosiloxanes such as silsesquioxanes, copolymers (co-condensates) thereof and hydrolysates thereof, polyorganosiloxanes such as polydiorganosiloxanes, and hydrolysates thereof, and combinations thereof. In a preferred embodiment, the organosiloxane (e.g. the silsesquioxane or the polyorganosiloxane) comprises one or more functional groups which are capable for a self-condensation reaction under the desired impregnation conditions, such as a hydroxy group, an alkoxy group such as methoxy, ethoxy, propoxy, butoxy, and the like known functional groups for a self-condensation reaction. Such groups are preferably positioned at a terminal position of the organosiloxane, but can also be located on a side chain, preferably at the terminal position thereof. Particularly preferable are silsesquioxanes as described below, preferably having one or more functional groups for a self-condensation reaction, as mentioned above, at a terminal position of the main chain or a side chain.

The term "silsesquioxanes" (also referred to as silasesquioxanes) as used herein includes silsesquioxanes as well as silsesquioxane copolymers (co-condensates). Silsesquioxanes per se are silicon-oxygen compounds wherein each Si atom is bound to an average of 3/2 (sesqui) O atoms and to one hydrocarbon group, having the general formula (I)

$$R_{2n}Si_{2n}O_{3n} \tag{I}$$

wherein
R is H or an organic residue having preferably from 1 to 20, more preferably 1 to 12 carbon atoms, and
n is an integer of 1 to 20, preferably 2 to 15, more preferably 3 to 12, and even more preferably 4 to 12. Preferably, the silsesquioxane used for impregnating the fiber blanket is solid at room temperature (23° C.±2° C.). Furthermore, the silsesquioxane preferably comprises a functional group, such as hydroxy or alkoxy group, at a terminal position, which can self-crosslink under the desired impregnation conditions as indicated below. They can in principle be obtained by e.g. hydrolytic condensation of trifunctional (e.g., trialkoxy-functional) silanes (e.g., $R—Si(OR)_3$).

In the above formula (I), R is an organic group or substituted organic group preferably containing from 1 to 20, more preferably 1 to 12, even more preferably 1 to 8 carbon atoms, and optionally one or more, preferably 1 to 5, heteroatoms selected from nitrogen, oxygen and sulfur, preferably nitrogen and oxygen. R of the silsesquioxane can be an alkyl, alkenyl, alkynyl, cycloalkyl, aryl, alkaryl or an aralkyl group, and these groups optionally can contain 1 to 5 heteroatoms such as nitrogen or oxygen. These groups optionally can contain one or more substituents such as amino, mercapto, hydroxyl, alkoxy, epoxy, acrylato, cyano and carboxy groups, wherein preferred substituents are amino, mercapto, epoxy or $C_1$-$C_8$-alkoxy groups.

Specific illustrative examples of R are $C_1$-$C_8$-alkyl such as methyl, ethyl, propyl, butyl, pentyl, hexyl, and heptyl; $C_2$-$C_8$-alkenyl such as vinyl, allyl, butenyl and hexenyl; $C_2$-$C_8$-alkynyl such as ethinyl and propinyl; $C_3$-$C_8$-cycloalkyl such as cyclopentyl, cyclohexyl and cycloheptyl; $C_1$-$C_8$-alkoxy such as methoxy, ethoxy, propoxy, butoxy, pentoxy and hexoxy; $C_2$-$C_8$-alkenoxy such as ethylenoxy, propylenoxy and butylenoxy; propargyl; optionally substituted aryl having 6 to 12 carbon atoms such as phenyl, tolyl, benzyl and naphthyl; $R^1$—(O—$R^2$)$_n$— or $R^3$—(NR$^5$—$R^4$)$_n$—, wherein $R^1$ to $R^4$ is independently an optionally substituted, saturated or unsaturated hydrocarbon group having up to 8 carbon atoms, preferably selected from the groups as mentioned above, $R^5$ is hydrogen or $C_1$-$C_8$ alkyl and n is 1 to 10; and all representatives of the above mentioned groups substituted by one or more amino, hydroxyl, mercapto, epoxy or $C_1$-$C_8$-alkoxy groups. From the above mentioned groups, optionally substituted $C_1$-$C_8$-alkyl, optionally substituted aryl having 6 to 12 carbon atoms, and $R^1$—(O—$R^2$)$_n$— or $R^3$—(NR$^5$—$R^4$)$_n$—, wherein $R^1$ to $R^4$ is independently an optionally substituted, saturated or unsaturated hydrocarbon group having up to 8 carbon atoms, preferably selected from the groups as mentioned above, $R^5$ is hydrogen or $C_1$-$C_8$ alkyl and n is 1 to 10, wherein the optional substituent is selected from amino, hydroxyl, mercapto, epoxy or $C_1$-$C_8$-alkoxy groups, is particularly preferred.

Further illustrative examples of the R are 3,3,3-trifluoropropyl, dichlorophenyl, aminopropyl, aminobutyl, $H_2NCH_2CH_2NH(CH_2)_3$—, $H_2NCH_2CH_2NHCH_2CH(CH_3)CH_2$—, mercaptopropyl, mercaptoethyl, hydroxypropyl, $CH_2$=CHCOO($CH_2$)$_3$—, $CH_2$=C($CH_3$)COO($CH_2$)$_3$—, cyanopropyl, cyanoethyl, carboxyethyl and carboxyphenyl groups. Of course, the substituents on the hydrocarbon residues should not be reactive with water. The methyl, ethyl, propyl, the aminomethyl, aminoethyl and aminopropyl, and mercaptoethyl and mercaptopropyl groups are preferred when a single silsesquioxane is used. When R is other than a methyl or mercaptopropyl it is preferred that the silsesquioxane be copolymerized with methyl silsesquioxane in a weight ratio of from 5 to 30:70 to 95, i.e., 5 to 30% by weight of $RSiO_{3/2}$ units and 70 to 95% by weight of $CH_3SiO_{3/2}$ units.

Silsesquioxanes preferably used in the present invention have a low average molecular weight (Mw), wherein Mw preferably is in the range of up to 10,000, preferably 200 to 6000 and still more preferably 250 to 5000 and 300 to 4000, determined by Gel Permeation Chromatography (GPC) using a polystyrene standard. GPC test methods are further explained in "Modern Size Exclusion Liquid Chromatography" Practice of Gel Permeation Chromatography, John Wiley and Sons, 1979. Useful silsesquioxanes are described in U.S. Pat. Nos. 3,493,424; 4,351,736; and 4,781,844, each incorporated herein by reference.

Silsesquioxane copolymers (co-condensates) include copolymers or co-condensates of silsesquioxane polymers of the formula $R^{11}SiO_{3/2}$ or of $R^{11}$—Si(OR$^{12}$)$_3$ with diorganooxysilanes (or hydrosylates thereof) of the formula $R^{11}{}_2Si(OR^{12})_2$ and/or tetraorganooxysilanes (or hydrosylates thereof) of the formula $Si(OR^{12})_4$ wherein each $R^{11}$ is as defined above for group R and preferably each $R^{11}$ represents an unsubstituted or substituted hydrocarbon radical having 1 to 12, preferably 1 to 8 carbon atoms, substituents of which may be amino, mercapto and epoxy groups, and $R^{12}$ is independently an alkyl group of 1 to 8, preferably 1 to 4 carbon atoms. The silsesquioxane may optionally further comprise a co-condensate of silanes of the formula $R^{11}{}_3SiOR^{12}$. Preferred silsesquioxane polymers are neutral or anionic.

Useful silsesquioxanes can be made by the techniques described in U.S. Pat. Nos. 3,493,424 (Mohrlok et al.), 4,351,736 (Steinberger et al.), 5,073,442 (Knowlton et al.) and 4,781,844 (Kortmann, et al).

In the present invention, mixtures of silsesquioxanes and of silsesquioxane copolymers can also be employed, if desired. The silsesquioxane should be solid, i.e. it is neither gaseous nor liquid at room temperature (23° C.±2° C.). The silsesquioxanes can be used as colloidal suspension. The silsesquioxanes may be prepared by adding silanes to a mixture of water, a buffer, a surfactant and optionally an organic solvent, while agitating the mixture under acidic or basic conditions. The surfactant used in the silsesquioxane preparation should be either anionic or cationic in nature. Best results are generally obtained with the cationic suspensions. It is preferable to add the quantity of silane uniformly and slowly in order to achieve a narrow particle size. The average particle size of the silsesquioxanes in the colloidal suspension should be within the range of 1 to 100 nm (10 to 1000 Angstroms), preferably in the range of 1 to 50 nm (10 to 500 Angstroms) or in the range of 1 to 40 nm (10 to 400 Angstroms), and more preferably in the range of 20 to 50 nm (200 to 500 Angstroms). The exact amount of silane that can be added depends on the substituent R and whether an anionic or cationic surfactant is used.

Silsesquioxane copolymers in which the units can be present in block or random distribution are formed by the simultaneous hydrolysis of the silanes. The preferred amount of the silanes of the formula $Si(OR^2)_4$, including hydrosylates thereof (e.g. of the formula $Si(OH)_4$), added is 2 to 50 wt. %, preferably 3 to 20 wt. %, relative to the weight of the silanes employed. The amount of tetraorganosilanes, including tetraalkoxysilanes and hydrosylates thereof (e.g. of the formula $Si(OH)_4$) present in the resulting composition is preferably less than 10 wt. %, preferably less than 5 wt. %, more preferably less than 2 wt. % relative to the weight of the silsesquioxane.

The following silanes are e.g. useful in preparing the silsesquioxanes of the present invention: methyltrimethoxysilane, methyltriethoxysilane, methyltriisopropoxysilane, ethyltrimethoxysilane, ethyltriethoxysilane, propyltrimetho xysilane, isobutyltrimethoxysilane, isobutyltriethoxysilane, 2-ethylbutyltriethoxysilane, tetraethoxysilane and 2-ethylbutoxytriethoxysilane.

Preferably, the hydroxy number is from about 1000 to 6000 per gram, and is more preferably from about 1500 to 2500. The hydroxy number may be measured, for example, by titration or the molecular weight may be estimated by $^{29}Si$ NMR.

A useful silsesquioxane containing essentially no residual tetraalkyoxysilanes (or hydrosylates thereof such as $Si(OH)_4$) is SR 2400 Resin™ available from Dow Corning, Midland, Mich. A particularly preferred example of a silsesquioxane is Dri-Sil 55™ from Dow Corning, which is 98 wt. % (3-(2-aminoethyl)aminopropyl)methylsesquioxane having methoxy at the terminus, in methanol.

In a further embodiment of the present invention, the siloxane compound is a polyorganosiloxane, preferably a polydiorganosiloxane. Preferably, the polyorganosiloxane used for impregnating the fiber blanket is solid at room temperature (23° C.±2° C.). Furthermore, the polyorganosiloxane preferably comprises a functional group, such as hydroxy or alkoxy, at a terminal position, which can self-crosslink under the desired impregnation conditions as indicated below. Polyorganosiloxanes preferably used in the present invention have a low average molecular weight (Mw), wherein Mw preferably is in the range of up to 10,000, preferably 200 to 6000 and still more preferably 250 to 5000 and 300 to 4000, determined by Gel Permeation Chromatography (GPC) using a polystyrene standard. For example, a polyorganosiloxane, preferably a polydiorganosiloxane, can be used in which at least about 50% of the total silicon-bonded substituents are methyl groups and any remaining substituents are other monovalent hydrocarbon groups such as the higher alkyl groups (having e.g. 4 to 20 carbon atoms), e.g. tetradecyl and octadecyl, phenyl groups, vinyl groups and allyl groups, and monovalent hydrocarbonoxy and substituted hydrocarbon groups, for example alkoxy groups, alkoxy-alkoxy groups, fluoroalkyl groups, hydroxyalkyl groups, aminoalkyl and polyamino (alkyl) groups, mercaptoalkyl groups and carboxyalkyl groups. Specific examples of such hydrocarbonoxy and substituted hydrocarbon groups are methoxy, ethoxy, butoxy, methoxyethoxy, 3,3-trifluoro-propyl, hydroxymethyl, aminopropyl, beta-aminoethyl-gamma-aminopropyl, mercaptopropyl and carboxybutyl. In addition to the aforementioned organic substituents the organosiloxane may have silicon-bonded hydroxyl groups (normally present in terminal silanol groups), or silicon-bonded hydrogen atoms as in, for example, the poly(methylhydrogen) siloxanes and copolymers of dimethylsiloxane units with methylhydrogensiloxane units and/or dimethylhydrogensiloxane units.

In some cases the polyorganosiloxane, such as the polydiorganosiloxane, may comprise two or more different types of siloxanes, or it may be employed in conjunction with other organosilicon compounds. For example, the polyorganosiloxane may comprise both a silanol-terminated polydimethylsiloxane and a crosslinking agent therefore such as a poly (methylhydrogen) siloxane, an alkoxy silane e.g. $CH_3Si(OCH_3)_3$ and/or $NH_2CH_2CH_2NH(CH_2)_3Si(OC_2H_5)_3$ or partial hydrolysates and condensates of such silanes. Thus, any of a wide range of organosiloxanes may be employed as polyorganosiloxane depending on the properties. Generally preferred as polyorganosiloxanes, e.g. polydiorganosiloxanes, are polyorganosiloxanes having terminal silicon-bonded reactive groups, e.g. hydroxyl and alkoxy groups, employed either alone or in combination with other organosiloxane compounds.

The above polyorganosiloxane, e.g. a polydiorganosiloxane, can also be used in combination with an organosilane of the general formula (II)

(II)

wherein each Y represents a monovalent group having less than 6 carbon atoms selected from hydrocarbon groups, alkoxy groups and alkoxyalkoxy groups, at least one Y being alkoxy or alkoxyalkoxy, R represents a divalent group having from 3 to 10 carbon atoms, the said group being composed of carbon, hydrogen and, optionally, oxygen present in the form of ether linkages and/or hydroxyl groups, R' represents a monovalent hydrocarbon group having from 1 to 15 carbon atoms or the group $(-OQ)_aOZ$, wherein Q represents an alkylene group having 2 or 3 carbon atoms, a has a value of from 1 to 20 and Z represents a hydrogen atom, an alkyl group or an acyl group, each R" represents a methyl or an ethyl group and X represents a halogen atom.

In the above specified general formula (II) the divalent group R is composed of carbon and hydrogen or carbon, hydrogen and oxygen, any oxygen being present in the form of ether linkages and/or hydroxyl groups. The group R may therefore be, for example, methylene, ethylene, hexylene, xenylene, —CH$_2$CH$_2$OCH$_2$CH$_2$— and —(CH$_2$)$_2$OCH$_2$CH(OH)CH$_2$—. Preferably R represents the groups —(CH$_2$)$_3$—, —(CH$_2$)$_4$— or —CH$_2$CH(CH$_3$)CH$_2$—. The R' group may be any monovalent hydrocarbon group having from 1 to 15 carbon atoms, for example an alkyl group, e.g. methyl, ethyl, propyl, butyl or tetradecyl, an alkenyl group, e.g. vinyl, or an aryl, alkaryl or aralkyl group, e.g. phenyl, naphthyl, tolyl, 2-ethylphenyl, benzyl and 2-phenylpropyl. The R' group may also be the group —(OQ)$_a$OZ as hereinabove defined, examples of such groups being —(OCH$_2$CH$_2$)OH, —(OCH$_2$CH$_2$)$_3$OH, —(OCH$_2$CH$_2$)$_3$(OCH$_2$CH$_2$CH$_2$)$_3$OC$_4$H$_9$ and —(OCH$_2$CH$_2$)$_2$OC$_3$H$_7$. As the Y substituents there may be present monovalent hydrocarbon groups such as methyl, ethyl, propyl and vinyl, and alkoxy and alkoxyalkoxy groups, for example methoxy, ethoxy, butoxy and methoxyethoxy. At least one Y should be alkoxy or alkoxyalkoxy, the preferred silanes being those wherein the Y substituents are selected from methyl groups and alkoxy or alkoxyalkoxy groups having less than 4 carbon atoms. Preferably, X represents chlorine or bromine.

The above organosilanes are known substances and can be prepared for example by the reaction of a tertiary amine, e.g. C$_{15}$H$_{31}$N(CH$_3$)$_2$, with a haloalkylsilane, e.g. chloropropyltrimethoxy silane, or by the addition of an unsaturated amine to a hydrosilicon compound followed by reaction of the product with a hydrocarbyl halide or a hydrogen halide.

In a further embodiment of the invention, the fibers can be impregnated with an organosilicon compound selected from an alkoxy group-containing silane, preferably an optionally substituted alkyl- or aryl-alkoxysilane, more preferably an optionally substituted alkyl- or aryl-trialkoxysilane of the formula RSi(OR')$_3$, a hydrolysate and a condensate thereof, and combinations thereof. If R is alkyl, the alkyl group preferably contains 1 to 20, more preferably 1 to 16, even more preferably 1 to 10 or 1 to 8 carbon atoms. Preferred alkyl groups are methyl, ethyl, propyl, methylethyl, butyl, pentyl, hexyl, and cyclohexyl. If R is aryl, the aryl group is preferably phenyl. The alkoxy group OR' preferably contains 1 to 12, more preferably 1 to 8, even more preferably 1 to 6 carbon atoms. Preferred alkoxy groups are methoxy and ethoxy, also 2-methoxyethoxy and isopropoxy are useful. The alkoxy groups are selected independently from each other. The optional substituent is preferably selected from amino, optionally further substituted with e.g. C$_1$-C$_6$-alkyl or amino-C$_1$-C$_6$-alkyl; epoxy, 3-glycidyloxy, 3-(meth)acryloxy, mercapto and C$_1$-C$_6$-alkoxy groups. In a preferred embodiment only the alkyl group is substituted. A hydrolysate and/or a condensate, particularly a self-condensate, of such an alkoxy group-containing silane compound can be formed e.g. in an aqueous solution of said silane, in particular, if said aqueous solution is not immediately but only some hours later applied.

Examples of trialkoxysilanes are methyltrimethoxysilane, methyltriethoxysilane, methyltriisopropoxysilane, ethyltrimethoxysilane, ethyltriethoxysilane, propyltrimethoxysilane, isobutyltrimethoxysilane, isobutyltriethoxysilane, 2-ethylbutyltriethoxysilane, tetraethoxysilane, 2-ethylbutoxytriethoxysilane, phenyltriethoxysilane, cyclohexyltriethoxysilane, methacryloxytrimethoxysilane, glycidoxytrimethoxysilane, and N-(2-aminoethyl)-3-aminopropyltrimethoxysilane. Examples of alkyl- or phenyl-trialkoxysilanes are commercially available under the trade name Dynasylan® from Degussa, an example of which is Dynasylan® PTMO which is a propyltrimethoxysilane.

Impregnation materials also include blends of trialkoxysilanes as mentioned above with tetraalkoxysilanes of the formulae Si(OR)$_4$ or Si(OR)$_3$OR' or Si(OR)$_2$(OR')$_2$ wherein R and R' are an optionally substituted alkyl group preferably containing 1 to 20, more preferably 1 to 16, even more preferably 1 to 10 or 1 to 8 carbon atoms. Preferred alkyl groups are methyl, ethyl, propyl, methylethyl, butyl, pentyl, hexyl, and cyclohexyl. The optional substituent is preferably selected from amino, optionally further substituted with e.g. C$_1$-C$_6$-alkyl or amino-C$_1$-C$_6$-alkyl; epoxy, 3-glycidyloxy, 3-(meth)acryloxy, mercapto and C$_1$-C$_6$-alkoxy groups.

Fiber mats of the present invention may be prepared by a method e.g. comprising first forming a fiber blanket from the above described inorganic fibers and then impregnating said fiber blanket with one or more of the above organosilicon compounds. In an alternative method, the method comprises impregnating the inorganic fibers as described above with one or more of the above organosilicon compounds and forming a fiber mat from said impregnated fibers. The fibers or the fiber blanket are preferably treated with an aqueous solution or dispersion containing one or more of the above organosilicon compounds. The solids content of the solution or dispersion to be used is preferably in the range of 0.01 to 20 g/l. In a preferred embodiment of the present invention a solution or dispersion, preferably an aqueous solution or dispersion, containing one or more of the above siloxanes, preferably silsesquioxanes, is used. The organosilicon compounds, e.g. the siloxanes or the silsesquioxanes, can react with the surface of the inorganic fibers after hydrolysis and they can condensate with themselves after hydrolysis. The hydrolysis can be supported e.g. by the addition of an acid. The solution or dispersion, which preferably is aqueous, optionally can further contain usual additives such as stabilizers, surfactants, auxiliary solvents, anti-foaming agents, inorganic and organic acids etc. Examples of auxiliary solvents are hydrophilic organic solvents such as methanol, ethanol and propanol. The solution or dispersion of the organosilicon compound(s) is applied by e.g. immersing the fibers or fiber blanket into said solution or dispersion, or by spray coating said solution or dispersion onto the fibers or the fiber blanket. The solution or dispersion is applied such that essentially the entire fiber blanket is soaked. If, for example, a spray coating method is used, the solution or dispersion is sprayed continuously or discontinuously on the upper surface of a fiber blanket until the lower surface gets wet. The resulting fibers or fiber mat is then dried preferably using a hot air oven. The drying temperature is preferably in the range of 50-200° C., more preferably in the range of 100-160° C. The drying time is about five minutes to 5 hours, preferably 30 minutes to 180 minutes. The coating weight of the fiber mat with the organosilicon compound selected from the group consisting of siloxane compounds, alkoxy group-containing silanes, hydrolysates and condensates of these compounds, and combinations thereof, is preferably in the range of 0.01 to 20 wt %, more preferably 0.05 to 10 wt %, and even more preferably 0.1 to 7 wt % or 0.1 to 5 wt %, and most preferably 0.1 to 3 wt %, based on the weight of the fiber blanket.

Fibers or fiber mats treated with the above organosilicon compounds, particularly with the silsesquioxanes or alkoxy group-containing silanes, show improved pliability. The organosilicon compounds, such as the siloxane compounds, particularly the above silsesquioxanes, also can improve the bulkiness of the blankets and prevent the inorganic fibers from scattering. Furthermore, because the organosilicon compounds and alkoxy group-containing silanes contained in the mats can cause a decrease of the coefficient of friction of the mats to the metal housing in the canning process and improve the slipperiness of the mats, a lower stuffing load is required in comparison to commercial fiber mats containing organic binder. For example, the coefficient of friction of a fiber mat comprising fibers impregnated with a silsesquioxane in Example 2 below to stainless steel is about 14% lower than the coefficient of friction of the same fiber mat treated with a vinyl acetate-ethylene-acrylate terpolymer in Example 8. Fiber mats impregnated with the above organosilicon compounds, particularly the silsesquioxanes, also can provide an improved compression within the pollution control device.

It is preferred to apply the above polyorganosiloxane, e.g. the polydiorganosiloxane, and the above organosilane of formula (II) together. However, if desired, the fibers may be treated first with the polyorganosiloxane and the organosilane is then applied in a separate step, or vice versa. The components of the organosilane of formula (II) and the polyorganosiloxane, or mixtures of the two, can be applied to the fibers employing any suitable application technique, for example by total immersion or by spray coating. They may be applied from an organic solvent carrier or as an aqueous dispersion or emulsion. The proportion of the polyorganosiloxane applied to the fibers will depend to some extent on the effect desired. The coating weight of the fiber mat with the polyorganosiloxane/organosilane mixture, including optionally formed hydrolysates and/or condensates, is preferably in the range of 0.01 to 20 wt %, more preferably 0.05 to 10 wt %, and even more preferably 0.1 to 7 or 0.1 to 5 wt %, and most preferably 0.1 to 3 wt %, based on the weight of the fiber blanket. The proportion of the polyorganosiloxane to the organosilane employed is preferably from 0.5 to 5 to 0.2 to 4.

According to an embodiment of the invention, the fiber mat is arranged between a pollution control element and the housing of a pollution control device under compressive force, preferably a predetermined compressive force. Any undesirable movement of the pollution control element within the device can be prevented by high surface frictional force exerted by the outer surfaces of the fiber mat. A high friction coating applied (e.g. by coating, varnish spraying etc.) at least on the contact surface of the fiber mat with the pollution control element can further improve the coefficient of friction with the pollution control element and increase the reliability of the pollution control element, although such a coating is not always necessary on the fiber mat. Furthermore, when the pollution control element and the fiber mat having a high friction coating on the element side and wound around said element, are canned (i.e., assembled into the housing), the movement between the pollution control element and the wrapped fiber mat can be prevented or at least significantly reduced, without detrimentally affecting the ability of the element to be assembled.

In a further aspect of the present invention, a thin continuous or discontinuous coating of a high friction coating material is formed on the internal surface (i.e. the surface of the fiber mat to be contacted with the pollution control element) and optionally the external surface (i.e. the surface of the fiber mat to be contacted with the housing) of the fiber mat. The high friction coating is applied such that the high friction coating material does not essentially invade the fiber mat. Furthermore, the internal surface and optionally the external surface of the fiber mat is coated with a high friction coating such that the coefficient of friction between the optionally coated external surface of the fiber mat and the housing is lower than the coefficient of friction between the coated internal surface of the fiber mat and the catalyst element. The organic portion of the high friction coating decomposes and dissipates partly or completely under typical operating conditions of the catalyst element. The high friction coating of the external surface can be the same as or can be different to the high friction coating of the internal surface of the fiber mat. To obtain the desired mounting characteristics, precaution must be taken so that there is a difference in the impregnation amount between the side of the external surface and the side of the internal surface of the fiber mat, if the same coating material is used on both surfaces. For impregnation with the same high friction coating, the solid component content of the coating material with which the side of the internal surface is impregnated should therefore be larger than that of the coating material with which the side of the external surface is impregnated. It has been shown that excellent stuffing results can be achieved when the friction difference between both sides is maximized. Although there is no specific restriction on the difference of the content of the high friction coating on the fiber mat, the solid component content of the high friction coating on the side of the internal surface of the fiber mat is preferably from about 5 to 100 $g/m^2$, more preferably from about 20 to 50 $g/m^2$. On the other hand, the solid component content of the high friction coating on the external surface of the fiber mat is preferably from about 0.5 to 10 $g/m^2$.

The high friction coating serves to improve the behaviour e.g. during the stuffing of catalyst, which is a commonly used canning method. The high friction coating is chosen to provide anti-skid properties on the surface of the catalyst element to avoid slippage of the mat during canning. The coating can be selected from natural or synthetic polymeric materials, preferably a resin or rubber material such as an acrylic resin or rubber such as an acrylic acid ester copolymer, a nitrile resin or rubber, a vinylacetate copolymer, a polystyrene resin, an acrylate-styrene copolymer, a styrene-butadiene resin, a SIS block copolymer, an EPDM, an ABS, a PE or PP film, etc., and combinations thereof. Many of these organic polymeric materials provide excellent anti-skid properties. Some of these organic polymers can soften at elevated temperatures, which can lead to reduced holding performance in a certain temperature/time window before the organic polymeric material degrades and disappears. Inorganic coatings such as silica-, alumina-, and clay-gels or particle slurries, etc. can be used, but may sometimes have lower anti-slip properties compared to organic polymeric material. Their advantage is that they do not decompose at higher temperatures and therefore provide a permanent friction increase leading to an increased mat holding performance. A further optimization of the holding performance can be achieved by putting an inorganic high friction coating on the housing side of the mat, which does not change the stuffing performance significantly, but leads to increased friction and mat holding performance.

In a preferred embodiment the high friction coating composition is composed of a latex that can be decomposed and dissipated at arbitrary reactions taking place under high temperature conditions applicable during operation of the catalytic converter. Usable latex herein includes a colloidal dispersion obtained by dispersing a natural or synthetic polymer material, preferably a resin material such as an acrylic acid ester copolymer, a vinylacetate copolymer, a polystyrene resin, an acrylate-styrene copolymer, a styrene-butadiene resin, and combinations thereof, into an aqueous medium or another medium, or an organic material such as a poly(vinyl alcohol). Optionally, the latex further comprises in admixture thereto one or more of a silica-, alumina-, or clay particles. Acrylic latex for which an acrylic resin is used can be particularly advantageously used. Examples of preferred lattices are Airflex® EAF67 dispersion (a vinylacetate-ethylene polymer) available from Air Products Polymers, or Acronal®

A 420 S, which is an aqueous, plasticizer-free dispersion of a thermally crosslinkable copolymer of acrylic acid esters, or Acronal® LA 471 S, both available from BASF.

In a further embodiment, the high friction coating with which the fiber mat is coated can also comprise the above described organic polymeric material and one or more types of abrasive particles. Further details, particularly with respect to useful organic polymeric materials and useful abrasive particles can be found in WO-A-2006/020058. For example, a slurry prepared by dispersing fine particles of an abrasive material in an organic polymeric material is applied to the surface(s) of the fiber mat. There is thus obtained a fiber mat having a coating in which fine particles of abrasive material(s) are selectively fixed at least on the internal surface and optionally the external surface of the fiber mat. Because the fine particles of the abrasive material are arranged at least on the contact surface of the fiber mat with the catalyst element, the coefficient of friction with the catalyst element can be increased and retaining reliability of the catalyst element can be further improved. Furthermore, when the catalyst element and the fiber mat, which is wound around the catalyst element, are canned, the movement between the catalyst element and the wrapped fiber mat can be prevented, or at least significantly reduced, without detrimentally affecting the ability of the catalytic converter to be assembled.

Coating of the fiber mat with a high friction coating as explained above, can be advantageously conducted with known conventional technologies such as spraying, brushing, laminating, printing (e.g. screen printing) and the like. A preferred method is spray coating by using e.g. a lacquer spray system such as an air brush, which is satisfactorily conducted by e.g. only preparing a spray solution or dispersion and successively or simultaneously spraying the solution or dispersion, e.g. the acrylic latex or the like lattices as mentioned above, on one or both main surfaces of the fiber mat. The operation is therefore simple and economical. The solution or dispersion subsequent to spraying may be dried naturally or dried by heating to a suitable temperature, e.g. 110° C. The solid component content of the high friction coating on the side of the internal surface of the fiber mat is preferably from about 5 to 100 $g/m^2$, more preferably from about 20 to 50 $g/m^2$, and the solid component content of the high friction coating on the external surface of the fiber mat is preferably from about 0.5 to 10 $g/m^2$. Preferably, a thin continuous or discontinuous coating of the high friction coating material is formed on the internal and optionally the external surface of the fiber mat, respectively. The used coating method is adapted such that any capillary actions of the fiber mat are minimized and that the high friction coating material does not essentially invade the fiber mat. That is, the high friction coating should substantially be present only on the surface of the fiber mat and should not essentially infiltrate the mat. This can be achieved by using, for example, coating solutions or dispersions having a high solids concentration, addition of emulsifying agents or thixotropic agents or the like additives having similar effects to the solution or dispersion, coating the fiber mat under a compressed status, coating conditions under which the used solvent rapidly evaporates and the like, or by lamination of the essentially solvent-free high friction coating. It is preferred that the high friction coating infiltrates less than 10%, preferably less than 5%, more preferably less than 3% and most preferably less than 1% of the thickness of the fiber mat.

According to an embodiment of the present invention, a high friction coating (e.g. an acrylic latex) is applied on at least the internal surface of the fiber mat after its impregnation such that the coefficient of friction on the side of the catalyst element is higher than that on the side of the housing. The frictional force or adhesion between the fiber mat and the catalyst element can be adjusted to become larger by using a higher amount of the high friction coating or a different anti-skid coating material providing a higher friction, and the frictional force between the fiber mat and the housing is conversely decreased so that the fiber mat can be made slippery within the housing during canning. Thus, a stuffing load and a deformation (elongation) of the fiber mat can consequently be made small. Furthermore, because the fiber mat can be stuffed without deformation, the operability can be significantly improved. Moreover, because the deformation amount of the fiber mat is made small, the retention property and erosion resistance of the fiber mat itself can be greatly improved. Therefore, the use of a high friction coating can provide the advantages that (a) movement or separation between catalyst element and fiber mat when the two are assembled, e.g. pushed or canned, into the housing while the fiber mat is wrapped around the catalyst element, can be minimized, (b) that the catalyst element can stably be retained in position within the housing after the catalyst element is loaded into the housing, and (c) that the heat resistance, surface pressure retaining property, erosion resistance and processability can be improved.

Figure 1:
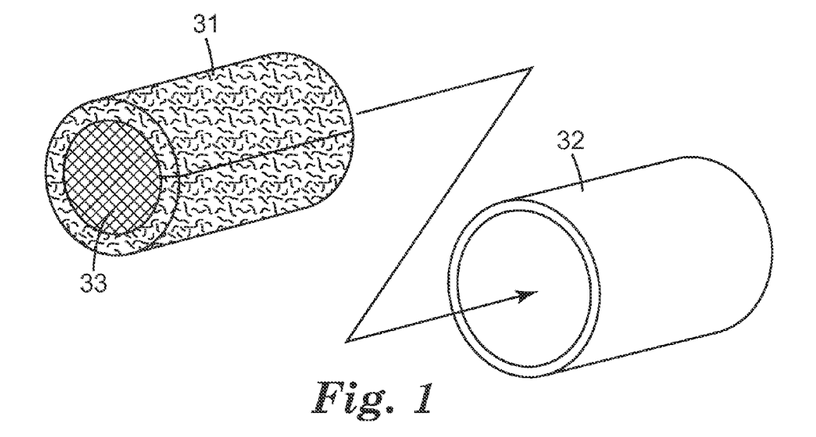
FIG. 1 is a perspective view showing a method of inserting a catalyst element 33 surrounded by a fiber mat 31 into the metal housing 32 of a catalytic converter.
Figure 2:
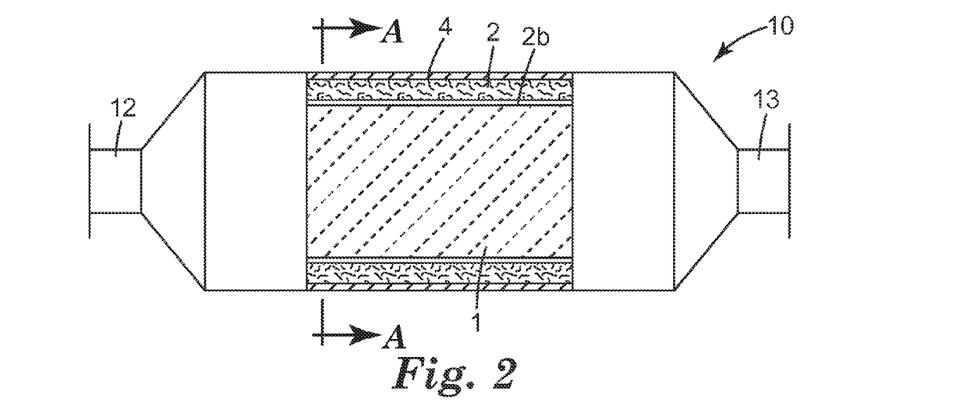
FIG. 2 is a side view showing a typical embodiment of the catalytic converter according to the present invention, with the principal portion thereof cross-sectioned for the sake of easy understanding of the structure.
Figure 3:
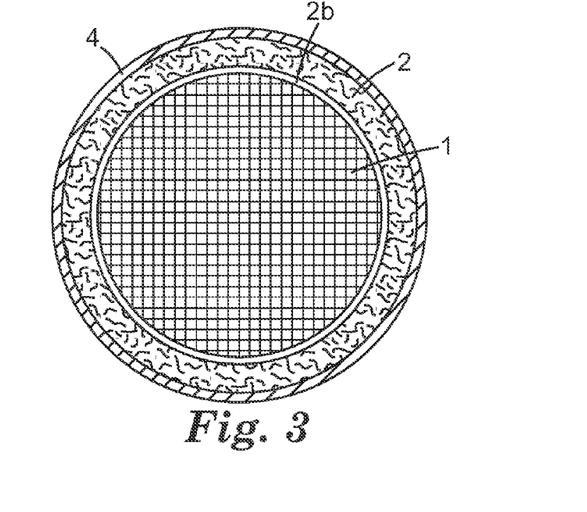
FIG. 3 is a cross-sectional view taken along the line A-A of the catalytic converter in FIG. 2
Figure 4:
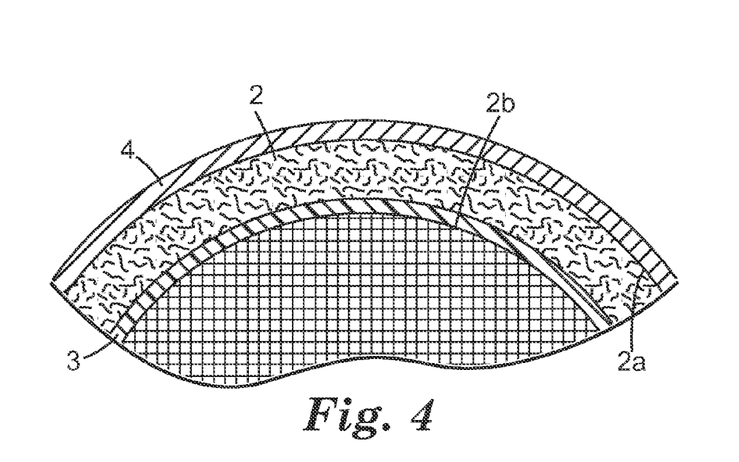
FIG. 4 is a cross-sectional view showing a high friction coating on the internal peripheral surface 2b of the fiber mat 2 of the present invention. As schematically shown in this Figure, the fiber mat 2 is inserted between a housing 4 and a catalyst element 1, wherein the internal peripheral surface 2b on the side of the catalyst element 1 of the fiber mat 2 is coated with a high friction coating 3 that is decomposable and dissipatable under the high temperature conditions of use. The internal surface 2b of the fiber mat 2 is coated with a high friction coating such that the coefficient of friction between the external surface 2a of the fiber mat 2 and the housing 4 is lower than the coefficient of friction between the coated internal surface 2b of the fiber mat 2 and the converter element 1. The present invention includes not only embodiments in which the fiber mat 2 is coated with the high friction coating 3 over the entire internal surface 2b of the fiber mat 2, but also embodiments in which the surface 2b of the fiber mat 2 is partially impregnated therewith.

A pollution control device according to the present invention such as a catalyst converter generally comprises (a) a housing, (b) a pollution control element such as a catalyst element or particulate filter element within the housing, and (c) an inorganic fiber mat as described above arranged between the housing and the pollution control element. The solid catalyst element within the housing is usually composed of a catalyst carrier having e.g. a honeycomb ceramic structure with a plurality of exhaust gas passages, and a catalyst. Particulate filters consist of a similar ceramic structure, but are wall flow substrates, i.e. every other channel is plugged at each end, which forces the gas flow through the substrate walls. The housing of the catalytic converter or particulate filter of the present invention can be prepared from various metal materials that are known to those skilled in the art, in any arbitrary shape in accordance with desired action, effects, and the like. An appropriate metal housing is made of a stainless steel, and has a shape as shown in FIG. 2. A metal housing having an arbitrary, suitable shape can be prepared from a metal such as e.g. untreated or treated iron, any sorts of steel, aluminum or titanium, or an alloy of metals.

Catalytic converter elements contain a catalyst, which is typically coated on a monolithic structure. The monolithic structures are typically ceramic, although metal monoliths have also been used. The solid catalyst carrier can be prepared from a material that is similar to a material employed in a conventional catalytic converter, in a shape similar to that of the material employed therein. Appropriate catalyst carriers are known to those skilled in the art, and include those produced from metal, ceramics, and the like. Useful catalyst carriers are disclosed in, for example, U.S. Reissue Pat. No. 27,747. Moreover, ceramic catalyst carriers are commercially available from, for example, Corning Inc. in the U.S.A. For example, a honeycomb-shaped ceramic catalyst carrier is available from Corning Inc. under the trade name of CEL-COR, and another one is available from NGK Insulated Ltd. (Nagoya, Japan) under the trade name of HONEYCERAM. Metal catalyst carriers are commercially available from, for example, Emitec in Germany. In addition, for detailed explanations of catalyst monoliths, refer to, for example, the following: SAE Techn. Paper 900,500, "System Approach to Packaging Design for Automotive Catalytic Converters" by Stroom et al.; SAE Techn. Paper 800,082, "Thin Wall Ceramics as Monolithic Catalyst Support" by Howitt; and SAE Techn. Paper 740,244, "Flow Effect in Monolithic Honeycomb Automotive Catalytic Converter" by Howitt et al.

Diesel particulate filters or traps are typically wall flow filters, which have honeycombed, monolithic structures typically made from porous crystalline ceramic materials. Alternate cells of the honeycombed structure are typically plugged such that exhaust gas enters in one cell and is forced through the porous wall to an adjacent cell where it can exit the structure. In this way, the small soot particles that are present in diesel exhaust gas are collected. Suitable diesel particulate filters made of cordierite are commercially available from Corning Inc. (Corning N.Y.) and NGK Insulated Inc. (Nagoya, Japan). Diesel particulate filters made of silicon carbide are commercially available from Ibiden Co. Ltd. (Japan) and are described in, for example, JP 2002047070A.

Catalysts to be supported on catalyst carriers explained above are usually metals (such as e.g. platinum, ruthenium, osmium, rhodium, iridium, nickel and palladium), and metal oxides (such as e.g. vanadium pentoxide and titanium dioxide), and are preferably used in the form of coatings. For a detailed explanation of such a catalyst coating, refer to, for example, U.S. Pat. No. 3,441,381.

In the practice of the present invention, the catalytic converter can be produced in various structures and by various methods as long as the production does not depart from the scope of the present invention. The catalytic converter can be prepared by, for example, the following procedure: A catalyst layer (catalyst coating) composed of a noble metal such as platinum, rhodium or palladium, is supported on a honeycomb-shaped ceramic monolith to give a final catalyst element. The resulting honeycomb-shaped ceramic catalyst element is wrapped into a fiber mat as described above. The fiber mat is preferably used while compressed to an appropriate level or in other words, under application of a predetermined compressive force, so as to acquire a suitable bulk density, when it is fitted into the housing. Compression includes clam shell compression, stuffing compression and tourniquet compression and other canning methods. The fiber mat according to the invention can be used advantageously for the production of a so-called "push-in structure" catalytic converter in which the catalyst element-fiber mat assembly is pushed under pressure into a cylindrical housing, for example, as in stuffing compression. The silsesquioxane impregnated mat can also be used advantageously for tourniquet.

For the catalytic converter of the invention, it is generally unnecessary to use bonding means such as, for example, an adhesive tape or pressure-sensitive adhesive sheet between the catalyst element and the fiber mat. However, such bonding means may be auxiliarily used if it exerts no adverse effects on the action and effects of the invention and rather improves the adhesion or friction between the catalyst element and the fiber mat, and if the effect of promoting the canning operation can be expected. If used, the bonding means is preferably used only partially. Moreover, although a protective coating is generally unnecessary, the fiber mat may have a protective coating for protecting the surface from damage.

The invention typically provides improved high performance fiber mounting mats for a broad application range including diesel filter, diesel oxidation catalysts, $NO_X$ traps and converters, closed coupled and manifold mounted converters, sensitive substrates like ultra-thin-wall etc. These mats do not show any compression set at low temperature operating conditions and release extremely low levels of emissions during the first start of the vehicle engine. The fiber mats conveniently reduce or avoid unpleasant smell generally produced by known fiber mats during the first uses of a new pollution control device, and reduce OBD sensor issues. Furthermore, the fiber mats typically increase the performance at low operating temperatures, e.g. at about 200° C. Moreover, the fiber mats may show good operability during inserting the fiber mat in a state of being wound around a catalyst element into the housing of a catalytic converter, generally do not separate from the catalyst element during the insertion, and typically are excellent in heat resistance, aerial pressure retaining properties and erosion resistance. Furthermore, the present invention provides a pollution control device in which the inserted fiber mat may be excellent in one or more of heat insulation, retention of the catalyst element, and the like. The pollution control devices can advantageously be used for treating exhaust gases from internal combustion engines of vehicles (e.g. such as automobiles, trucks, trains, aircrafts or watercrafts) or power generators.

EXAMPLES

The present invention will be further explained with reference to the following examples. Note that the present invention should not be restricted to only the examples. Numerical data indicated in the examples in "%" are based on the weight, if not stated otherwise.

Materials Employed in the Examples

Needle-punched, alumina-silica fiber blanket manufactured by Mitsubishi Chemical Functional Products Inc., commercially available under the trade name MAFTEC® MLS-2. The alumina-silica fiber blanket comprises 72% aluminium oxide and 28% silicon oxide and does not contain any organic binder.

Flecs N2.3 from Ibiden Co. Ltd. consists of a needle-punched alumina-silica fiber blanket and 10% of an acrylic copolymer ester binder. The fibers consist of 72% $Al_2O_3$ and 28% $SiO_2$.

Flecs N4 from Ibiden Co. Ltd. has the same composition as described above, but only 1% of an acrylic copolymer ester binder.

Interam™ 1600HTE is a needle punched alumina-silica fiber blanket containing 5% of an acrylic copolymer ester binder. The fibers consist of 72% $Al_2O_3$ and 28% $SiO_2$. This fiber blanket is commercially available by 3M Company (St. Paul, Minn., USA).

(3-(2-Aminoethyl)aminopropyl)methylsilsesquioxane is commercially available as DRI-SIL 55™ from Dow Corning Corporation, a multifunctional, self-crosslinking, water-soluble siloxane.

Aqueous dispersion of an acrylic acid ester is commercially available as Acronal® A 420S from BASF AG, Germany.

Aqueous dispersion of a terpolymer of vinyl acetate, ethylene and an acrylate is commercially available as AIRFLEX EAF67 from Air Products Polymers.

Test Methods

1.) Loss on Ignition (LOI)—Measurement of Organic Content of Fiber Mats

A sample of an impregnated fiber mat having a dimension of 50 mm×50 mm is dried at 110° C. for 2 hours using a hot air oven ULP 500 from Memmert GmbH & Co. KG. The sample is then allowed to cool to room temperature (23±2° C.) in an exsiccator under dry conditions (e.g. using $CaCl_2$ or a molecular sieve). After weighing the sample, the sample is heated to 600° C. for 2 hours using e.g. a muffle furnace LH 120/14 from Nabertherm, then allowed to cool to room temperature in an exsiccator under dry conditions and weighed again. The difference before and after heating to 600° C. is generally considered as LOI of a fiber mat, presuming that under these conditions essentially the whole content of organic material decomposes and dissipates. For calculating the total organic content of an organosilicon compound containing fiber mat (e.g., of a with Dri-Sil 55™ impregnated fiber mat), first the organic content of the used organosilicon compound (e.g. the Dri-Sil 55™) needs to be measured which is described below. Based on this value the total organic content of the impregnated fiber mat can be determined. For example, if the organic content of a specific silsesquioxane (e.g. the Dri-Sil 55™) is about 50% and the LOI of the impregnated fiber mat is about 1%, the silsesquioxane content of the impregnated fiber mat is about 2%, if the used fiber blanket does not contain organic material.

In order to determine whether a fiber blanket to be impregnated contains an organic binder, the above measurement of organic content of the fiber mat is first carried out with the fiber blanket without the impregnation. The difference before and after heating to 600° C. is considered as organic binder content of the fiber blanket, presuming that under these conditions essentially the whole organic binder material decomposes and dissipates. The obtained LOI has to be considered in the above measurement of the impregnated fiber mat.

2.) Loss on Ignition (LOI)—Measurement of the Organic Content of the Organosilicon Compound A sample of an organosilicon compound, e.g. a silsesquioxane, which would be used for fiber mat impregnation, is weighed into an alumina pan and dried at 80° C. for 2 hours using a hot air oven ULP 500 from Memmert GmbH & Co. KG. The sample is then allowed to cool to room temperature (23±2° C.) in an exsiccator under dry conditions (e.g. using $CaCl_2$ or a molecular sieve). After weighing the sample is measured in a Thermogravimetric Analysis TA Instruments 2950 TGA from TA Instruments with a heating rate of 10° C./min from room temperature to 1000° C. The weight loss of the sample is considered as organic content of the organosilicon compound.

3.) Coefficient of Friction

Figure 5:
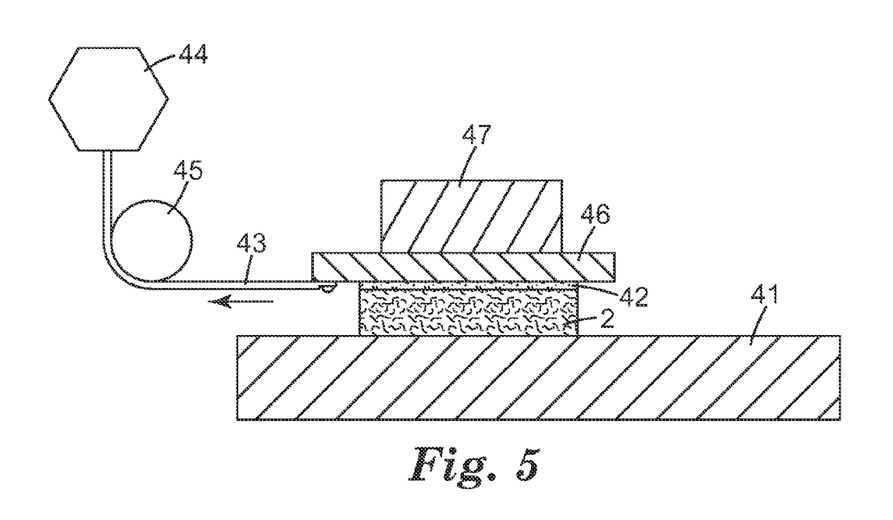
FIG. 5 is a sectional view typically showing a method of measuring the coefficient of friction of a fiber mat or blanket test piece.

To measure the coefficient of friction the fiber mat test samples were die cut to a size of 50 mm length×40 mm width, the samples having a thickness of 9 mm. Next, as shown in FIG. 5, the surface of a sample 2 opposite the surface to be tested was then attached by a double-sided adhesive tape 42 to a sledge 46 which is then placed with the sample surface to be tested on a scratch free flat stainless steel plate 41 with a dimension of 150 mm length×50 mm width. The sledge 46 is equipped with an additional weight 47 to a total load of 118 N. The sledge 46 is then pulled by means of a cord 43 and optionally a pulley 44 with a tensile speed of 30 mm/min over a distance of 20 mm over the stainless steel plate 41 using a Material Testing System MTS RT/30 from MTS Systems Corporation (Eden Prairie Minn., USA). The pulling force is measured with a 1 kN load cell 44 using a Material Testing System MTS RT/30 from MTS Systems Corporation. The coefficient of static friction μ is calculated from the maximum pull force $F_{pull}$ divided by the normal force $F_N$ exerted between the surfaces according to formula:

$$\mu = F_{pull}/F_N$$

4.) Compression Set Values after Pre-Heating a.) Preparation of Test Samples for Compression Set Measurements Maftec® MLS-2 samples with a base weight of 1400 g/m² in the size of 200×200 mm were impregnated by immersing them in solutions with varying concentrations of a) Dri-Sil 55™ from Dow Corning,
b) Acronal A420S from BASF, and
c) Airflex EAF 67 from Airproducts Polymers.

The impregnated mats were then dried in a microwave oven type Wavedom from LG for 60 min at 620 Watt. The dried mats were weighted and the content of the coating material was calculated from the difference before and after impregnation. In a next step samples with a diameter of 25.4 mm were obtained by die cutting.

b.) The Test Apparatus & Static Compression Test:

The test equipment comprised two anvils that could be advanced towards one another, thus compressing the mat sample that had been placed between them. The specific device employed was a Material Testing System MTS RT/30 (available from MTS Systems Corporation, Eden Prairie Minn., USA). The device was fitted with a 5 kN load cell to measure the resistance of the sample mat to compression and a height measuring device for measuring the thickness of the sample at various stages of compression.

The test was conducted by the following procedure. Each sample was first weighted. The weight then had to be corrected to the actual fiber weight without organic coating. Then, the weight per area of each sample was calculated by dividing the corrected weight of the sample by the surface area of the sample (calculated from the known diameter of 25.4 mm) and was recorded in g/mm². The gap between the anvils that was necessary to reach a final compressed density of 0.31 or 0.33 g/cm³ was then calculated. This was considered the desired density where the resistance to compression was to be measured.

Example Calculation:

$$\text{Gap size [cm]} = \frac{\text{Fiber weight per area (g/cm}^2\text{)}}{\text{Initial density (g/cm}^3\text{)}}$$

Thus, a sample with the weight per area of 1400 g/m² and an initial density of ca. 0.16 g/cm³ would need to be compressed to a thickness 4.52 mm to obtain a final density of 0.31 g/cm³. The sample was then placed on the lower anvil of the test equipment. The gap between the anvils was then closed at a rate of 25.4 mm per minute, starting from 20 mm distance between the anvils. The advancement of the anvils was then stopped at the gap between the anvils that was calculated above.

After a period of 45 seconds of compression at the calculated gap distance, the resistance to compression was measured and recorded in kPa.

5.) Experimental Stuffing Trials

Fiber mats having a dimension of 295 mm length×48 mm width were wound around the external surface of a cylindrical monolith body 86 mm in diameter and 55 mm long. The catalyst carrier around which the fiber mat was wound was stuffed within a cylindrical stainless steel casing 93.6 mm in inside diameter and 176 mm long with a guide cone at a rate of 40 mm/sec. In the stuffing trial the gap between the monolith and the casing was 3.8 mm.

Examples 1-3

Maftec® MLS-2 blanket pieces available from Mitsubishi Chemical Co., having a base weight of 1400 g/m² were immersed in a solution of Dri-Sil 55™ (Dow Corning) in water and then dried in a hot air oven ULP 500 from Memmert GmbH & Co. KG for 120 minutes at 110° C. The % solids of the Dri-Sil 55™ solution was for Example 1 0.1%, for Example 2 0.05% and for Example 3 0.02%. Test samples were cut according to the test method requirements as previously described.

Examples 4-7

Maftec® MLS-2 blanket pieces available from Mitsubishi Chemical Co., having a base weight of 1400 g/m² were impregnated by dipping them into aqueous solutions with different concentrations of Acronal A420S from BASF. The dipped blankets were then dried in a microwave oven type Wavedom from LG for 60 min at 620 Watt. The % solids of the Acronal A420S solution was for Example 4 0.1%, for Example 5 0.2%, for Example 6 1% and for Example 7 2.1%. Test samples were cut according to the test method requirements as previously described.

Examples 8-11

Maftec® MLS-2 blanket pieces available from Mitsubishi Chemical Co., having a base weight of 1400 g/m² were impregnated by dipping them into aqueous solutions with different concentrations of Airflex EAF 67 from Airproducts Polymers. The dipped blankets were then dried in a microwave oven type Wavedom from LG for 60 min at 620 Watt. The % solids of the Airflex EAF 67 solution was for Example 8 0.1%, for Example 9 0.15%, for Example 10 0.75% and for Example 11 1.8%. Test samples were cut according to the test method requirements as previously described.

Examples 12-13

Maftec® MLS-2 blanket pieces available from Mitsubishi Chemical Co., having a base weight of 1400 g/m², which already have been impregnated with Dri-Sil 55™ were spray coated with an aqueous 33% solids Acronal A420S solution using an air brush Sata HVLP Spray Gun 1.3 mm. The coated mats were then dried for 40 minutes at 110° C. in a hot air oven ULP 500 from Memmert GmbH & Co. KG. Example 12 is coated with 20 g/m² and Example 13 with 40 g/m² Acronal A420S. Test samples were cut according to the test method requirements as previously described.

Comparative Examples 1-3

Comparative Example 1 is Flecs N4 fiber blanket as previously described and is commercially available from Ibiden Co. Ltd.

This blanket will be referred to in the test results section as C1.

Comparative Example 2 is Flecs N2.3 fiber blanket as previously described and is commercially available from Ibiden Co. Ltd.

This blanket will be referred to in the test results section as C2.

Comparative Example 3 is Interam™ 1600 HTE fiber blanket as previously described and is commercially available from 3M Company (St. Paul, Minn., USA). This blanket will be referred to in the test results section as C3.

From each of the Comparative Examples untreated test samples were cut according to the test method requirements as previously described.

Test Results

1.) LOI (Loss on Ignition) Test Results—Measurement of Impregnated Fiber Mats

The LOI results are shown below in Table 1. It can clearly be seen that Comparative Examples C1 through C3 have a higher organic content than Examples 1 through 3.

TABLE 1

| Example No. | Concentration of Dri-Sil 55 ™ in water (g/l) | Organic Content (LOI, %) |
|---|---|---|
| 1 | 1 | 0.5 |
| 2 | 0.5 | 0.4 |
| 3 | 0.2 | 0.3 |
| C1 | — | 1.0 |
| C2 | — | 9.6 |
| C3 | — | 5.1 |

2.) Coefficient of Friction Test Results

The coefficient of friction test results are summarized in Table 2.

TABLE 2

| Example No. | Agent and amount thereof on the mat or blanket (%) | Coefficient of friction (μ) |
|---|---|---|
| 2 | Dri-Sil 55 ™ (0.8) | 0.225 |
| 5 | Acronal A 420S (1.1) | 0.241 |
| 8 | Airflex EAF 67 (0.8) | 0.261 |
| 9 | Airflex EAF 67 (1.0) | 0.302 |
| C2 | acrylic copolymer ester binder (5) | 0.295 |

The upper Table shows that Examples 5, 8 and 9 have a higher coefficient of friction than Example 2 at comparative coating contents.

3.) Compression Set Test Results

A static compression test was conducted at ambient conditions on the mats prepared in the Example 2 and Examples 4 through 11 to determine their resistance to compression. The resulting compression set test values are assembled in Table 3. As can be seen the Examples 4 to 11, which all contain an organic binder, have lower compression values at both tested densities when compared to the strictly with Dri-Sil 55™ impregnated Example 2.

TABLE 3

| Example No. | Agent and amount thereof on the mat or blanket (%) | Compression set in kPa (measured at a density of 0.31 g/cm³) | Compression set in kPa (measured at a density of 0.33 g/cm³) |
|---|---|---|---|
| 2 | Dri-Sil 55 ™ (0.8) | 128 | 189 |
| 4 | Acronal A 420S (0.5) | 101 | 143 |
| 5 | Acronal A 420S (1.1) | 90 | 138 |
| 6 | Acronal A 420S (4.5) | 29 | 72 |
| 7 | Acronal A 420S (10.8) | 15 | 55 |
| 8 | Airflex EAF 67 (0.8) | 116 | 175 |
| 9 | Airflex EAF 67 (1.0) | 109 | 153 |
| 10 | Airflex EAF 67 (4.5) | 74 | 111 |
| 11 | Airflex EAF 67 (9.6) | 2 | 3 |

4.) Stuffing Experiments

The results of the stuffing experiments were done by visual inspection. These results are summarized in Table 4. As can be seen Examples 12 and 13 outperform Comparative Examples C2 and C3.

TABLE 4

| Example No. | Results of visual inspection |
|---|---|
| 12 | Perfect stuffing, no shifting of mat at all, mat even sticks to the monolith after push-out from can |
| 13 | Perfect stuffing, no shifting of mat at all, mat even sticks to the monolith after push-out from can |

TABLE 4-continued

| Example No. | Results of visual inspection |
|---|---|
| C2 | Very poor shifting, about 30% of the blanket is outside the monolith/metal housing (can) |
| C3 | Very poor shifting, about 50% of the blanket is outside the monolith/metal housing (can) |

The invention claimed is:

1. A pollution control device comprising:
 (a) a housing,
 (b) a pollution control element within the housing, and
 (c) a non-intumescent, needle-punched fiber mat arranged between the housing and the pollution control element, the fiber mat comprising polycrystalline inorganic fibers impregnated with an organosilicon compound selected from the group consisting of siloxane compounds, alkoxy group-containing silanes, hydrolysates and condensates of these compounds, and combinations thereof.

2. The fiber mat according to claim 1, wherein the fibers are selected from alumina fibers, silica fibers, alumina-silica fibers, and combinations thereof.

3. The fiber mat according to claim 1, wherein said siloxane compound is selected from silsesquioxanes, silsesquioxane copolymers and combinations thereof.

4. The fiber mat according to claim 1, wherein the mat is essentially free of organic binder.

5. The fiber mat according to claim 1, the fiber mat further comprises a high friction coating on at least one of its major surfaces.

* * * * *

UNITED STATES PATENT AND TRADEMARK OFFICE
CERTIFICATE OF CORRECTION

PATENT NO. : 8,226,897 B2
APPLICATION NO. : 12/593647
DATED : July 24, 2012
INVENTOR(S) : Ulrich Kunze It is certified that error appears in the above-identified patent and that said Letters Patent is hereby corrected as shown below:

First Page, Right Column
Line 3 of the Abstract, delete "aluminia-silica" and insert -- alumina-silica --.

Column 1
Line 14, delete "aluminia" and insert -- alumina --.

Column 4
Line 17, delete "2" and insert -- 2. --.
Line 40, delete "aluminia-silica" and insert -- alumina-silica --.

Column 10
Line 60, delete "hydrosylates" and insert -- hydrolysates --.
Line 61, delete "hydrosylates" and insert -- hydrolysates --.

Column 11
Line 31, delete "hydrosylates" and insert -- hydrolysates --.
Line 35, delete "hydrosylates" and insert -- hydrolysates --.
Line 53, delete "tetraalkyoxysilanes" and insert -- tetraalkoxysilanes --.
Line 53, delete "hydrosylates" and insert -- hydrolysates --.
Line 57, delete "methylsesquioxane" and insert -- methylsilsesquioxane --.

Column 18
Line 60, delete "Insulated" and insert -- Insulators, --.
Line 61, delete "HONEYCERAM." and insert -- HONEYCREAM. --.

Column 19
Line 13, delete "Insulated Inc." and insert -- Insulators, Ltd. --.

Signed and Sealed this
Second Day of October, 2012

David J. Kappos
*Director of the United States Patent and Trademark Office*